(12) United States Patent
Salehpour et al.

(10) Patent No.: US 10,747,874 B2
(45) Date of Patent: Aug. 18, 2020

(54) SYSTEMS AND METHODS FOR CONTROLLING AN APPLICATION LAUNCH BASED ON A SECURITY POLICY

(71) Applicant: Symantec Corporation, Mountain View, CA (US)

(72) Inventors: Jonathon Salehpour, Culver City, CA (US); Somard Kruayatidee, Culver City, CA (US); Rad Stanev, Culver City, CA (US)

(73) Assignee: NortonLifeLock, Inc., Tempe, AZ (US)

( * ) Notice: Subject to any disclaimer, the term of this patent is extended or adjusted under 35 U.S.C. 154(b) by 175 days.

(21) Appl. No.: 15/985,734

(22) Filed: May 22, 2018

(65) Prior Publication Data

US 2019/0362067 A1 Nov. 28, 2019

(51) Int. Cl.
| | |
|---|---|
| *G06F 21/00* | (2013.01) |
| *G06F 21/53* | (2013.01) |
| *G06F 21/56* | (2013.01) |
| *G06F 21/57* | (2013.01) |

(52) U.S. Cl.
CPC .......... *G06F 21/53* (2013.01); *G06F 21/566* (2013.01); *G06F 21/57* (2013.01); *G06F 2221/033* (2013.01)

(58) Field of Classification Search
CPC .............................. G06F 21/53; G06F 21/566
USPC ............................................................ 726/1
See application file for complete search history.

(56) References Cited

U.S. PATENT DOCUMENTS

| | | | |
|---|---|---|---|
| 8,613,070 B1 * | 12/2013 | Borzycki | G06F 21/6218 726/8 |
| 9,111,089 B1 | 8/2015 | Bhatia et al. | |
| 9,876,896 B1 | 1/2018 | Gailloux et al. | |
| 10,146,517 B2 * | 12/2018 | Lim | G06F 21/51 |

(Continued)

FOREIGN PATENT DOCUMENTS

| | | |
|---|---|---|
| GB | 2492857 A | 1/2013 |
| WO | 2013/015968 A1 | 1/2013 |
| WO | 2019/226228 A1 | 11/2019 |

OTHER PUBLICATIONS

Velmurugan Sengottaian, Easy App Locker [EAL], https://play.google.com/store/apps/details?id=app.vel.murugan.easyapplocker.

(Continued)

*Primary Examiner* — Longbit Chai
(74) *Attorney, Agent, or Firm* — FisherBroyles, LLP

(57) ABSTRACT

The disclosed computer-implemented method for controlling an application launch based on a security policy may include (1) loading an application launcher into a sandbox, (2) monitoring one or more functions associated with launching an application from the application launcher, (3) determining that the functions associated with launching the application have been invoked by the application launcher, (4) querying a policy manager comprising a security policy to determine whether the application is potentially harmful, and (5) performing, based on the security policy, a security action preventing the application launcher from launching the application from the sandbox upon determining that the application is potentially harmful. Various other methods, systems, and computer-readable media are also disclosed.

20 Claims, 7 Drawing Sheets

(56) References Cited

U.S. PATENT DOCUMENTS

2006/0021029 A1    1/2006   Brickell et al.
2017/0053314 A1    2/2017   Glover et al.

OTHER PUBLICATIONS

Stanev, R., et al., "Systems and Methods for Executing Application Launchers," Co-pending U.S. Appl. No. 15/899,384, filed Feb. 20, 2018.
Salehpour, Jonathon, "Systems and Methods for Providing Persistent Visual Warnings for Application Launchers", U.S. Appl. No. 16/542,060 filed Aug. 15, 2019, 69 pages.
Non-Final Office Action received for U.S. Appl. No. 15/899,384 dated Dec. 2, 2019, 21 pages.
International Search Report and Written received for PCT Application Serial No. PCT/US2019/024115 dated Jun. 4, 2019, 11 pages.
Anonymous, "[APP] GO Launcher 1.1.3 released.", URL: http://forum.xda-developers.com/showthread.php?t=857269, Android Development and Hacking, Dec. 17, 2010, pp. 1-7.

\* cited by examiner

SYSTEMS AND METHODS FOR CONTROLLING AN APPLICATION LAUNCH BASED ON A SECURITY POLICY

BACKGROUND

Potentially harmful computer software applications such as viruses, Trojans, spyware, and other kinds of malware are a constant threat to a variety of computing systems and devices. Various types of security systems exist to combat these threats, including virus scanners and firewalls. Nevertheless, many potentially harmful applications still manage to infect computing systems and devices and may carry out a variety of malicious actions.

Security software vendors utilize various methods designed to detect potentially harmful applications after they have been launched on a computing device and may initiate a "kill" signal to stop a running application after determining that the application poses a potential threat. However, methods used by traditional systems to remove potential threats may often be inconsistent and/or ineffective (e.g., some applications are not configured to handle kill signals or an application having a signal handler may have gone awry in a way that prevents it from properly handling the signal) and thus fail to stop detected malicious applications from continuing to run on a computing device after they have been launched.

SUMMARY

As will be described in greater detail below, the instant disclosure describes various systems and methods for controlling an application launch based on a security policy.

In one example, a method for controlling an application launch based on a security policy may include (1) loading, by a computing device, an application launcher into a sandbox, (2) monitoring, by the computing device, functions associated with launching an application from the application launcher, (3) determining, by the computing device, that the functions associated with launching the application have been invoked by the application launcher, (4) querying, by the computing device, a policy manager including a security policy to determine whether the application is potentially harmful, and (5) performing, by the computing device, based on the security policy, a security action preventing the application launcher from launching the application from the sandbox upon determining that the application is potentially harmful.

In some examples, the security action may allow the application launcher to launch the application from the sandbox upon determining that the application is not potentially harmful. In some examples, an activity manager associated with the application launcher may be monitored for an application launch initiation function.

In some examples, querying the policy manager may include scanning the application using the policy manager to determine whether the application is potentially harmful. Additionally or alternatively, querying the policy manager may include a query for a blacklist to determine whether the application is potentially harmful.

In some examples, the security action to prevent the application launcher from launching the potentially harmful application from the sandbox may include blocking the application from being executed upon determining, at an application run-time, that the application is potentially harmful. In some examples, the security policy may be based on a time and/or a location associated with the launching of the application.

In some examples, the potentially harmful application may be malware or grayware. In some examples, the application launcher may be a mobile device application launcher.

In one embodiment, a system for controlling an application launch based on a security policy may include several modules stored in memory, including (1) a loading module that loads an application launcher into a sandbox on a computing device, (2) a monitoring module that monitors functions associated with launching an application from the application launcher, (3) a determining module that determines the functions associated with launching the application have been invoked by the application launcher, (4) a query module that queries a policy manager including a security policy to determine whether the application is potentially harmful, (5) a security module that performs, based on the security policy, a security action preventing the application launcher from launching the application from the sandbox on the computing device, upon determining that the application is potentially harmful, and (6) at least one physical processor that executes the loading module, the monitoring module, the determining module, the query module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) load an application launcher into a sandbox on a computing device, (2) monitor functions associated with launching an application from the application launcher, (3) determine that the functions associated with launching the application have been invoked by the application launcher, (4) query a policy manager including a security policy to determine whether the application is potentially harmful, and (5) perform, based on the security policy, a security action preventing the application launcher from launching the application from the sandbox on the computing device, upon determining that the application is potentially harmful.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
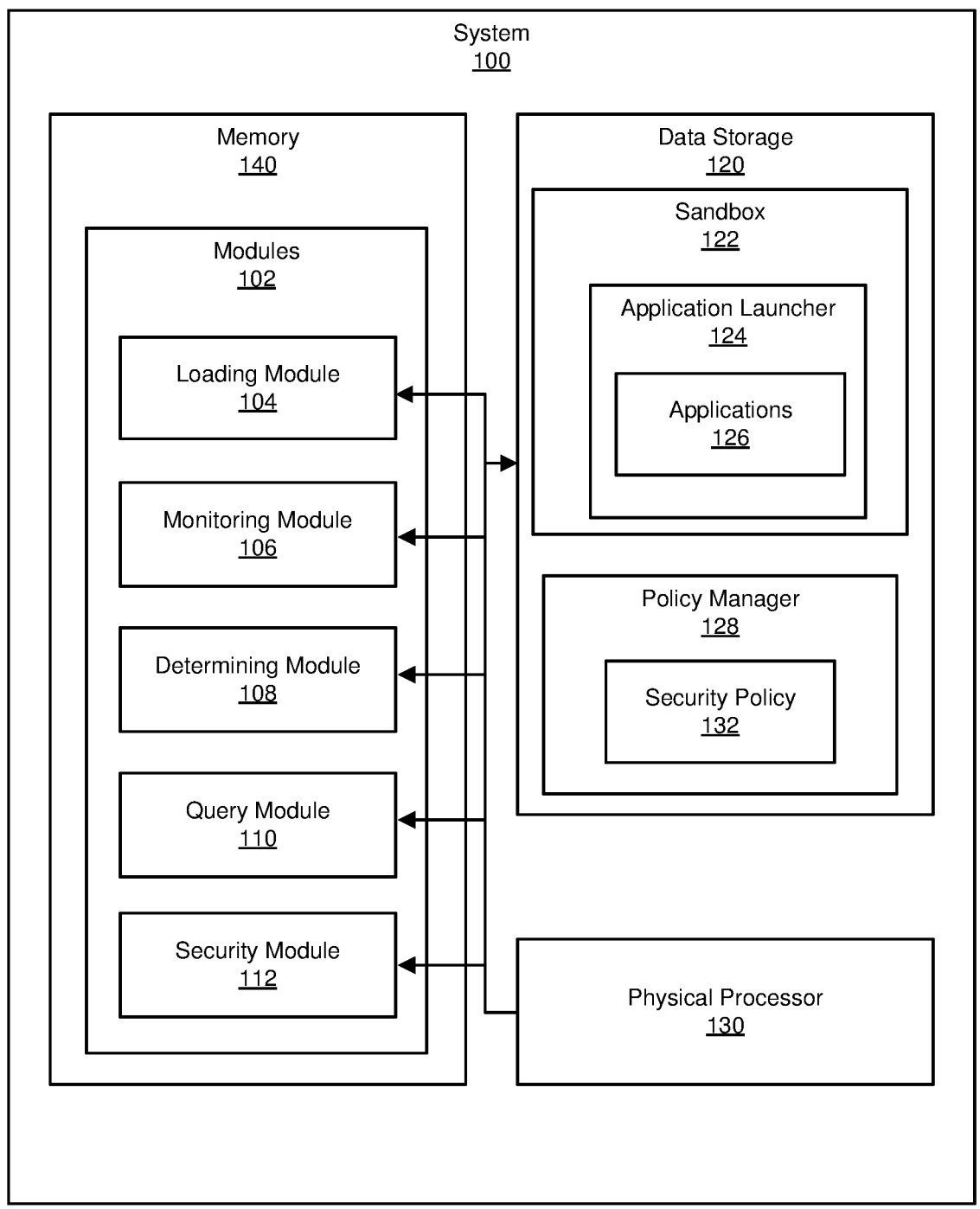
FIG. 1 is a block diagram of an example system for controlling an application launch based on a security policy.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for controlling an application launch based on a security policy. As will be explained in greater detail below, by sandboxing an application launcher on a computing device, the systems and methods described herein may safely determine whether an application is potentially harmful before being launched and, based on a security policy, perform a security action to either prevent the application launcher from launching the application (upon determining that the application is potentially harmful) or allow the application to run from the sandbox. In addition, the systems and methods described herein may improve the functioning of a computing device by preventing potentially malicious applications from being launched and run from an application launcher, thus protecting the computing system against infection by malware, grayware, and/or other harmful content.

Figure 2:
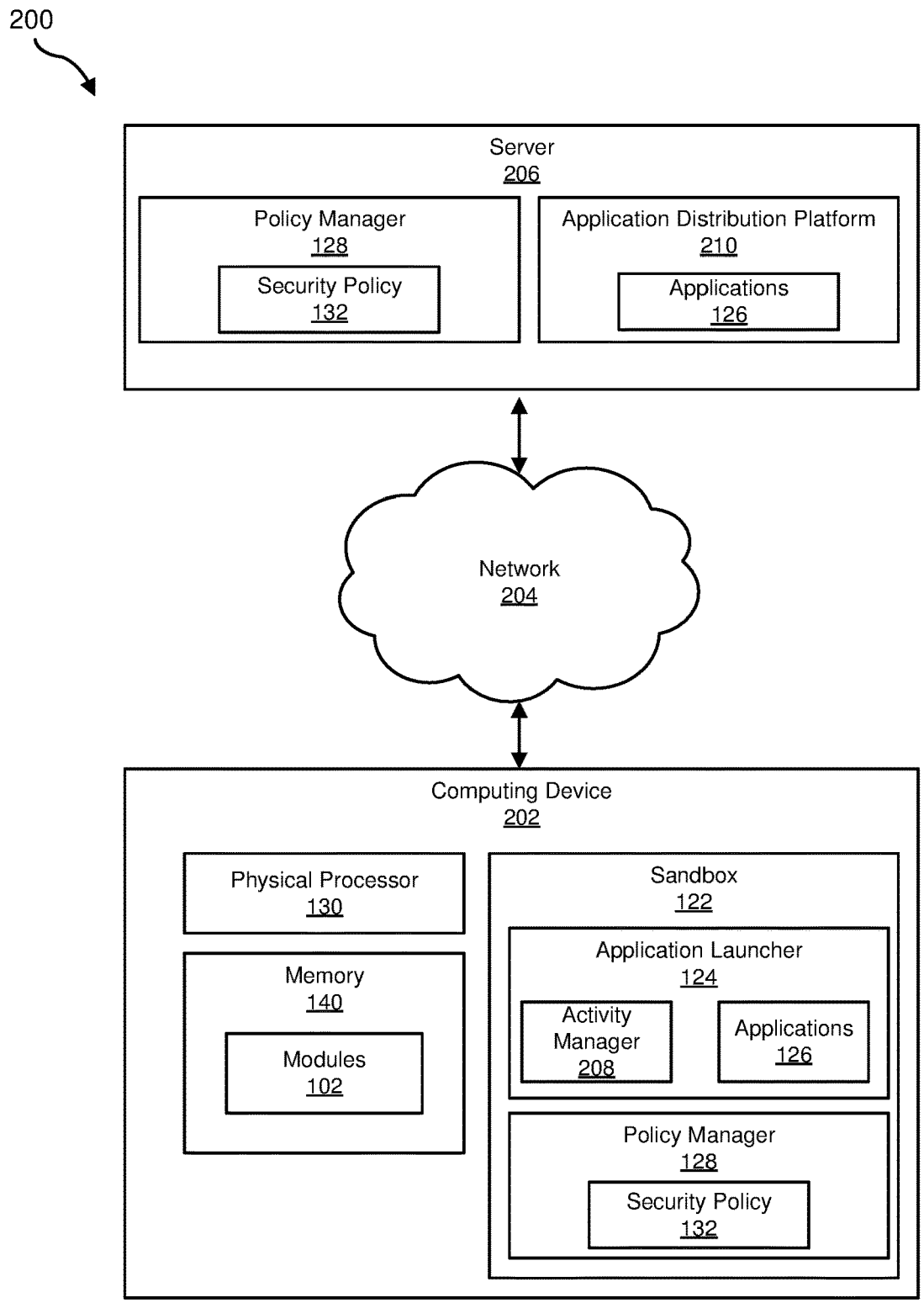
FIG. 2 is a block diagram of an additional example system for controlling an application launch based on a security policy.

The following will provide, with reference to FIGS. 1-2, detailed descriptions of example systems for controlling an application launch based on a security policy. Detailed descriptions of corresponding computer-implemented methods will also be provided in connection with FIG. 3. Detailed descriptions of example systems for allowing and blocking an application launch based on a security policy will also be provided in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for controlling an application launch based on a security policy. As illustrated in this figure, example system 100 may include one or more modules 102 for performing one or more tasks. As will be explained in greater detail below, modules 102 may include a loading module 104 that that loads an application launcher 124 into a sandbox 122, a monitoring module 106 that monitors functions associated with launching applications 126 from application launcher 124, a determining module 108 that determines the functions associated with launching applications 126 have been invoked by application launcher 124, a query module 110 that queries a policy manager 128 including a security policy 132 to determine whether any applications 126 are potentially harmful, and a security module 112 that performs, based on security policy 132, a security action preventing application launcher 124 from launching applications 126 from sandbox 122 upon determining that applications 126 are potentially harmful. Although illustrated as separate elements, one or more of modules 102 in FIG. 1 may represent portions of a single module or application.

As used herein, the term "application launcher" generally refers to executable program code on a computing device (e.g., a mobile computing device) that servers as a user's primary interaction point and helps a user to locate and start other application programs. For example, an application launcher may provide shortcuts to application programs and store the shortcuts in a single location so they are easier to find. In some examples, an application launcher may be associated with a mobile device operating system, such as the ANDROID mobile operating system.

As used herein, the term "sandbox" generally refers to a limited area of storage space on a computer system that isolates applications and application data from critical system resources, other applications, and other application data. A sandbox provides an extra layer of security that prevents harmful applications (e.g., malware) or harmful applications from negatively affecting the computer system. Sandboxed applications may only access resources in its limited storage space. If an application program needs to access resources or files outside of a sandbox, permission must be explicitly granted by the computer system.

As used herein, the term "policy manager" generally refers computer-executable code configured to apply a security policy. For example, a policy manager may include a mobile security application that scans other applications for security threats and applies a security policy based on whether the application is determined to harmful to a computing system. In some examples, a policy manager may apply security policies in a granular (e.g., a security policy may be applied based on time, location, etc.) or course manner.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controlling an application launch based on a security policy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120. Data storage 120 generally represents any type or form of storage system in system 100. In one example, data storage 120 may include storage space for sandbox 122, applications 126, and policy manager 128, and security policy 132.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to control an application launch based on a security policy. For example, and as will be described in greater detail below, one or more of modules 102 may cause computing device 202 to (1) load application launcher 124 into sandbox 122, (2) monitor functions associated with launching an application 126 from application launcher 124, (3) determine that the functions associated with launching an application 126 have been invoked by application launcher 124, (4) query policy manager 128 including security policy 132 to determine whether an application 126 is potentially harmful, and (5) perform, based on security policy 132, a security action preventing application launcher 124 from launching an application 126 from sandbox 122, upon determining that an application 126 is potentially harmful.

Computing device 202 generally represents any type or form of computing device capable of reading computer-executable instructions. In one example, computing device 202 may be a mobile client computing device running a mobile security application. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In one example, server 206 may be an application server hosting an application distribution platform 210 for distributing applications 126 to computing device 202. Server 206 may also remotely host policy manager 128 including security policy 132. Additional examples of server 206 include, without limitation, security servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Application launcher 124 on computing device 202 may also include an activity manager 208. Activity manager 208 generally represents any type or form of software manager that provides functions used to launch applications 126 from application launcher 208. For example, a "startActivity" function (and variants thereof) may be utilized to initiate the launching (e.g., running) of an application 126 from application launcher 124.

Figure 3:
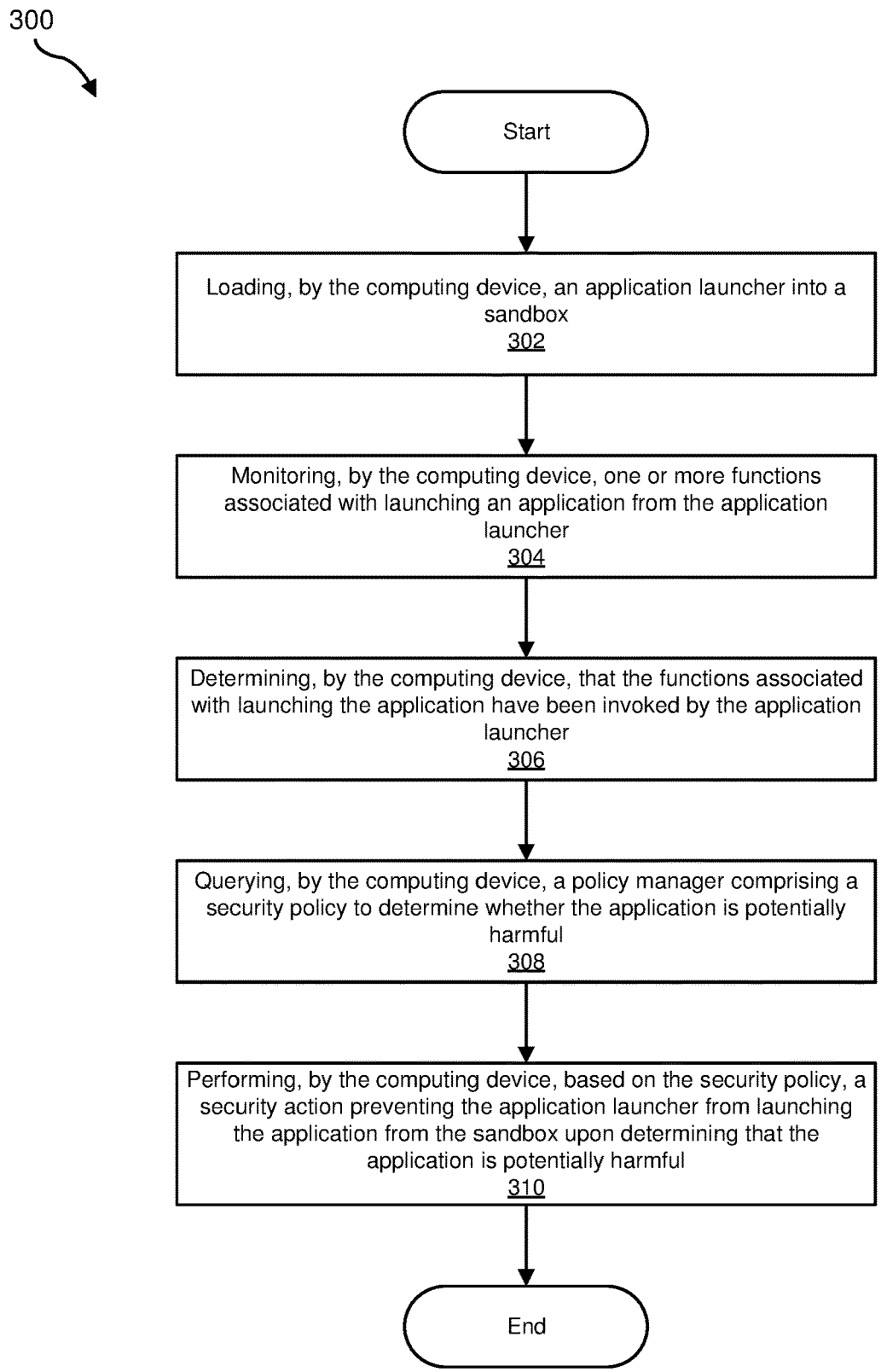
FIG. 3 is a flow diagram of an example method for controlling an application launch based on a security policy.

FIG. 3 is a flow diagram of an example computer-implemented method 300 for controlling an application launch based on a security policy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may load, by a computing device, an application launcher into a sandbox. For example, loading module 104 may, as part of computing device 202 in FIG. 2, load application launcher 124 into sandbox 122. In some examples, application launcher 124 may include a mobile device application launcher.

Loading module 104 may load application launcher 124 in a variety of ways. For example, loading module 104 may, as part of a mobile device security application running on computing device 202, retrieve an existing application launcher (i.e., application launcher 124) associated with computing device 202's operating system and execute application launcher 124 in sandbox 122.

At step 304, one or more of the systems described herein may monitor, by the computing device, one or more functions associated with launching an application from the application launcher. For example, monitoring module 106 may, as part of computing device 202 in FIG. 2, monitor functions associated with launching an application 126 from application launcher 124.

Monitoring module 106 may monitor the functions associated with launching an application 126 in a variety of ways. For example, monitoring module 106 may monitor activity manager 208 associated with application launcher 124 for an application launch initiation function. In some examples, monitoring module 106 may be configured to inject software code (e.g., "hooks") into application launcher 124 for the purpose of monitoring functions (e.g., an application launch initiation function) typically used to launch new applications (e.g., applications 126) from application launcher 124. In some examples, a hook may include functionality provided by monitoring module 106 to augment existing code in application launcher 124 for the purpose of monitoring (e.g., intercepting) function calls made between application launcher 124 and applications 126.

At step 306, one or more of the systems described herein may determine, by the computing device, that the functions associated with launching the application monitored at step 304, have been invoked by the application launcher. For example, determining module 108 may, as part of computing device 202 in FIG. 2, determine that one or more of the functions monitored in activity manager 208 have been invoked by application launcher 124.

Determining module 108 may determine that the functions associated with launching an application 126 have been invoked in a variety of ways. For example, determining module 108 may determine (e.g., using previously injected software hooks) that an application initiation function has been invoked by application launcher 124 to launch an application 126.

At step 308, one or more of the systems described herein may query, by the computing device, a policy manager comprising a security policy to determine whether the application is potentially harmful. For example, query module 110 may, as part of computing device 202 in FIG. 2, query policy manager 128 to determine whether an application 126 is potentially harmful.

Query module 110 may query policy manager 128 in a variety of ways. For example, query module 110 may scan an application 126 using policy manager 128 to determine, based on security policy 132, whether the application is potentially harmful. Additionally or alternatively, query module 110 may query policy manager 128 for a blacklist to determine whether an application 126 is listed and therefore potentially harmful. In some examples, an application containing malware and/or grayware is determined to be potentially harmful. In some examples, security policy 132 may include a granular security policy based on a time and/or a location associated with invoking a launch of an application 126 from application launcher 124. Additionally or alternatively, security policy 132 may be based on a coarse security policy that is independent of time and/or location constraints associated with invoking a launch of an application 126 from application launcher 124.

At step 310, one or more of the systems described herein may perform, by the computing device, based on the security policy, a security action preventing the application launcher from launching the application from the sandbox upon determining that the application is potentially harmful. For example, security module 112 may, as part of computing device 202 in FIG. 2, perform a security action based on security policy 132 to prevent application launcher 124 from launching an application 126 that has been determined to be potentially harmful, from sandbox 122.

Security module 112 may perform a security action in a variety of ways. For example, security module 112 may block an application 126 from being executed from application launcher 124 after having determined, at a run-time for an application 126, that an application 126 is potentially harmful.

Figure 4:
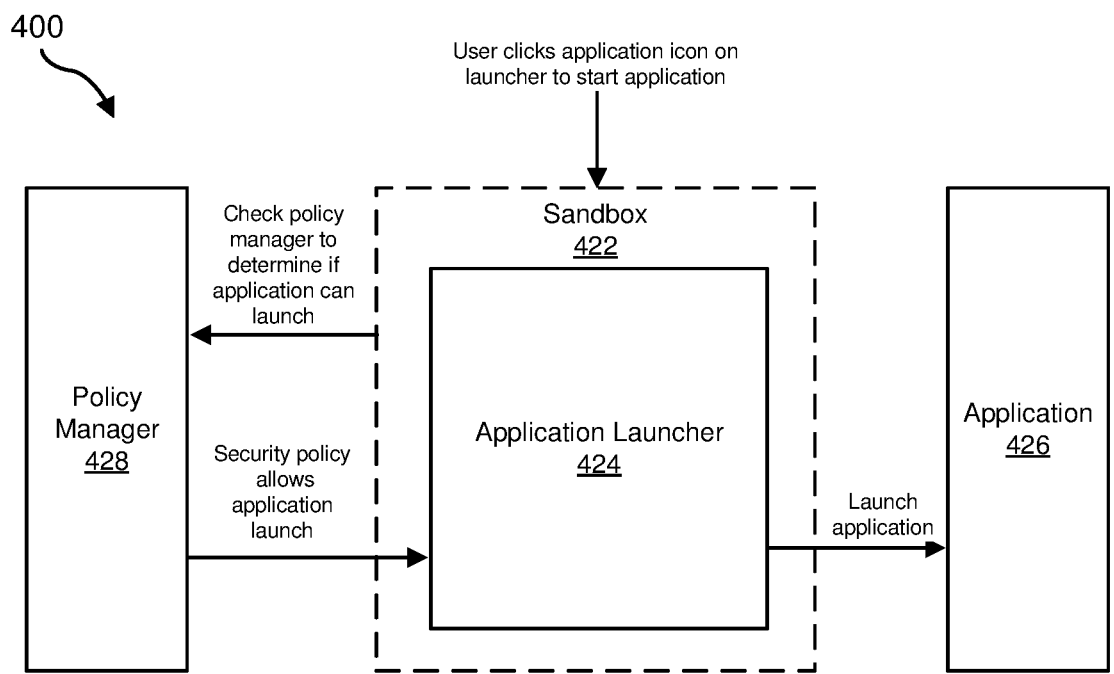
FIG. 4 is a block diagram of an example system for allowing an application launch based on a security policy.

FIG. 4 is a block diagram of an example system 400 for allowing an application launch based on a security policy. In the system 400 of FIG. 4, a user may click an application icon on an application launcher 424 that has been loaded in a sandbox 422 for running an application 426.

In some examples, application launcher 424 may be configured to query a policy manager 428 to determine if application 426 may be launched. Upon receiving the query, policy manager 428 may determine (e.g., based on a security scan) that application 426 is not harmful and that a security policy associated with policy manager 428 may allow application 426 to launch. Policy manager 428 may then enforce the security policy on application launcher 424 in sandbox 422. Based on the enforced security policy, application launcher 424 may then launch application 426 from sandbox 422.

Figure 5:
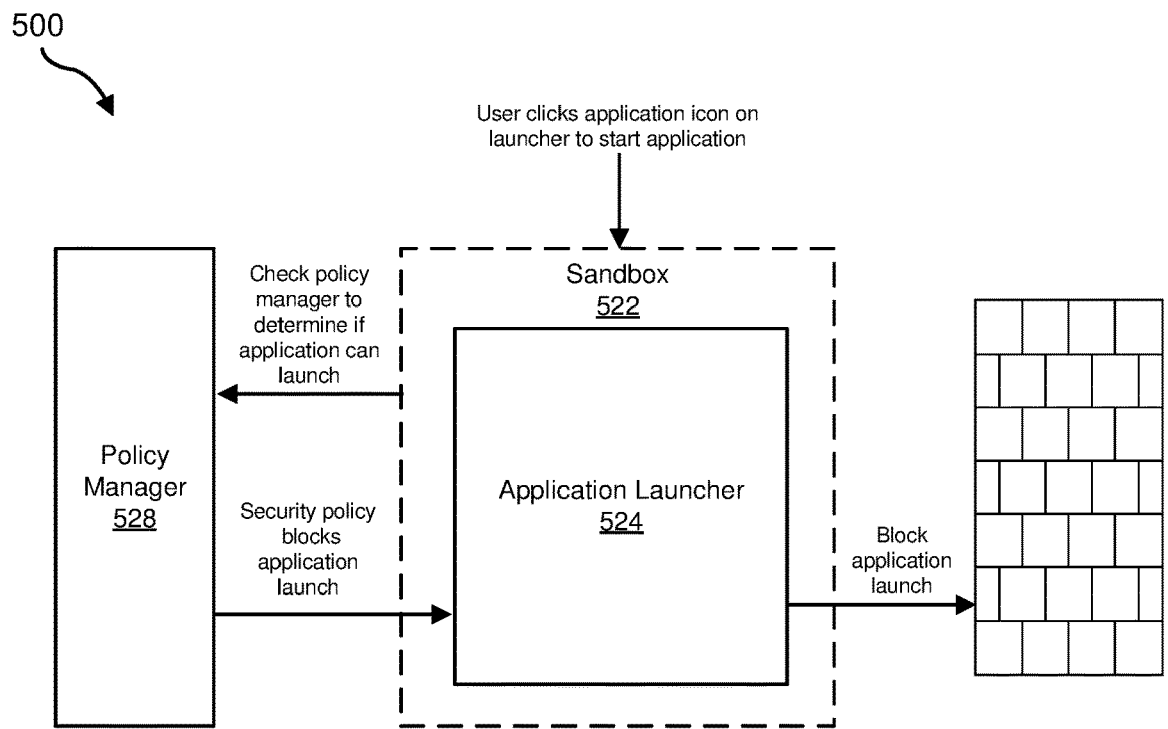
FIG. 5 is a block diagram of an example system for blocking an application launch based on a security policy.

FIG. 5 is a block diagram of an example system 500 for blocking an application launch based on a security policy. In the system 500 of FIG. 5, a user may click an application icon on an application launcher 524 that has been loaded in a sandbox 522 for running an application.

In some examples, application launcher 524 may be configured to query a policy manager 528 to determine if the application may be launched. Upon receiving the query, policy manager 528 may determine (e.g., based on a security scan) that the application is harmful (e.g., contains malware or the malicious content) and that a security policy associated with policy manager 528 may block the application from launching. Policy manager 528 may then enforce the security policy on application launcher 524 in sandbox 522. Based on the enforced security policy, application launcher 524 may block the launching of the application.

As explained in connection with example method 300 in FIG. 3 above, the systems and methods described herein may utilize a security policy and sandboxing to stop potentially dangerous applications from running on a computing system (e.g., a mobile device), without modification or ownership over the applications. The probability of a computing system becoming attacked and/or infected increases greatly once a potentially dangerous application has started to run. However, since traditional systems only attempt (often inconsistently and/or ineffectively) to kill running applications and/or require a user interaction (e.g., providing a password to unlock an application so that it may be launched from an application launcher), traditional systems may not be able to fully prevent potentially dangerous applications from negatively affecting the operation of a computing system. By sandboxing an application launcher to identify potentially harmful applications even before they have had a chance to run, the systems and methods described herein may utilize a security policy to prevent these applications from causing harm to a computing system in a transparent manner and without user interaction.

Figure 6:
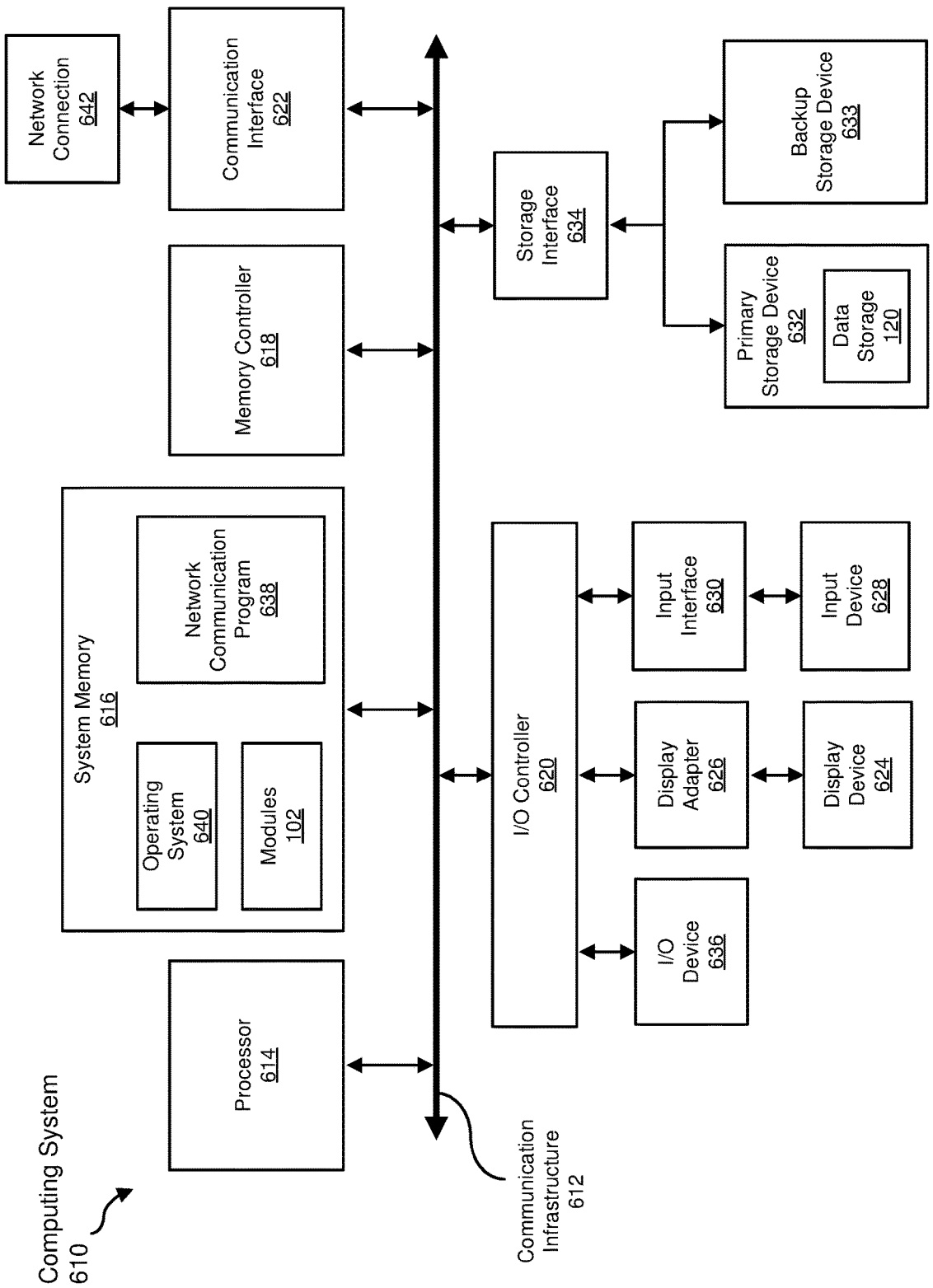
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
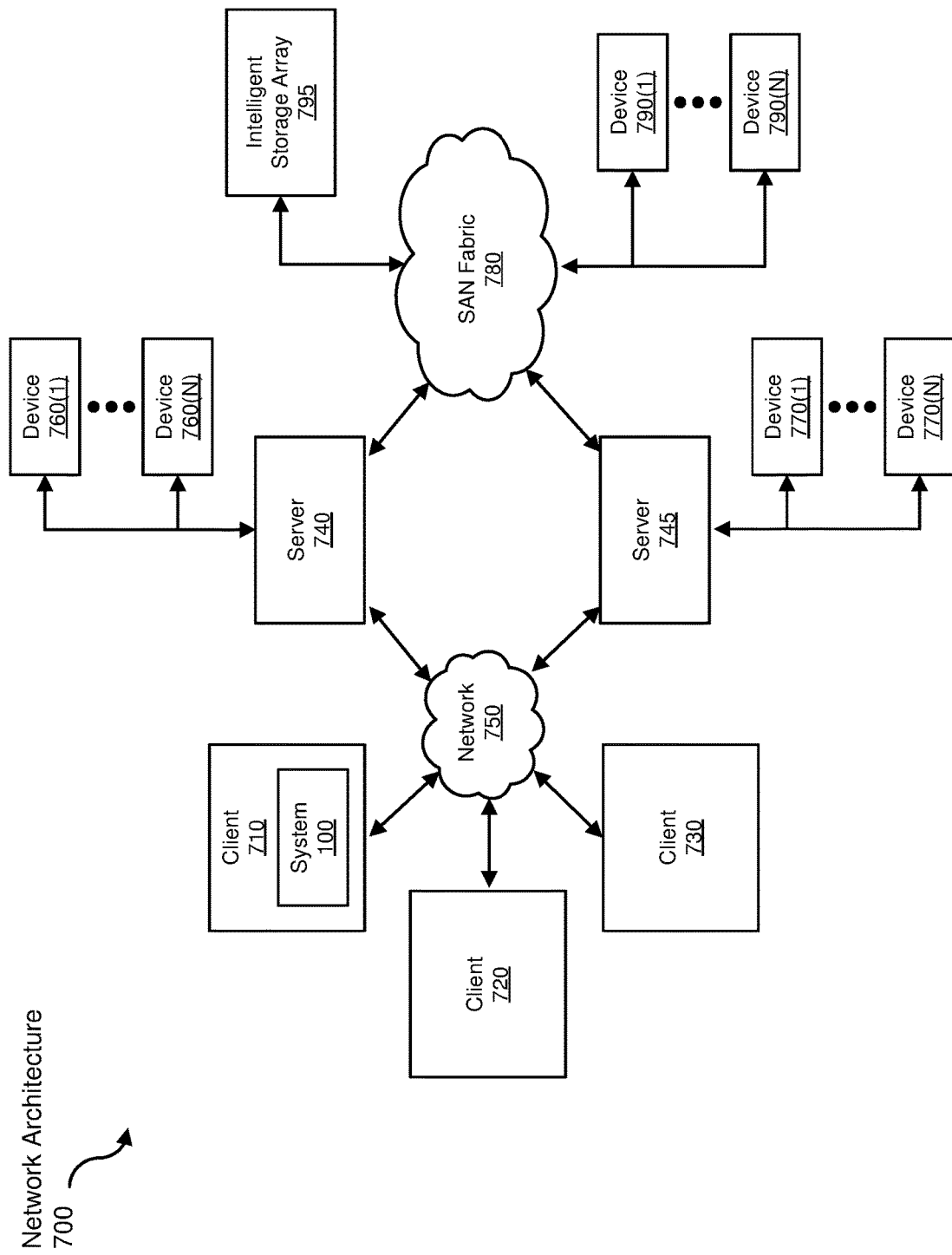
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for controlling an application launch based on a security policy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling an application launch based on a security policy, at least a portion of the method being performed by a computing device comprising at least one hardware processor, the method comprising:

loading, by the computing device, an application launcher into a security sandbox;

monitoring, by the computing device, one or more functions associated with launching an application from the application launcher;

determining, by the computing device, that the functions associated with launching the application have been invoked by the application launcher, wherein the determination comprises determining, using previously injected software hooks, that an initiation function for running the application has been invoked by the application launcher, wherein the injected software hooks are included in the security sandbox and located at a location of a start of the one or more functions to monitor how an original application launcher executing within the security sandbox attempts to access a resource provided in an operating system environment of the computing device;

querying, by the computing device, a policy manager comprising a security policy to determine whether the application is potentially harmful; and performing, by the computing device, based on the security policy, a security action preventing the application launcher from launching the application from the security sandbox upon determining that the application is potentially harmful.

2. The computer-implemented method of claim 1, further comprising performing, by the computing device, based on the security policy, a security action allowing the application launcher to launch the application from the security sandbox upon determining that the application is not potentially harmful.

3. The computer-implemented method of claim 1, wherein monitoring, by the computing device, the one or more functions associated with launching an application from the application launcher comprises monitoring an activity manager associated with the application launcher for the initiation function.

4. The computer-implemented method of claim 1, wherein querying, by the computing device, the policy manager comprising the security policy to determine whether the application is potentially harmful comprises scanning the application using the policy manager to determine, based on the security policy, whether the application is potentially harmful.

5. The computer-implemented method of claim 1, wherein querying, by the computing device, the policy manager comprising the security policy to determine whether the application is potentially harmful comprises querying the policy manager for a blacklist to determine whether the application is potentially harmful.

6. The computer-implemented method of claim 1, wherein performing, by the computing device, based on the security policy, the security action to prevent the application launcher from launching the potentially harmful application from the security sandbox upon determining that the application is potentially harmful comprises blocking the application from being executed upon determining, at an application run-time, that the application is potentially harmful.

7. The computer-implemented method of claim 1, wherein the security policy is based on one or more of a time and a location associated with the launching of the application.

8. The computer-implemented method of claim 1, wherein the potentially harmful application comprises at least one of malware and grayware.

9. The computer-implemented method of claim 1, wherein the application launcher comprises a mobile device application launcher.

10. A system for controlling an application launch based on a security policy, the system comprising:
- a loading module, stored in memory, that loads an application launcher into a security sandbox on a computing device;
- a monitoring module, stored in the memory, that monitors one or more functions associated with launching an application from the application launcher;
- a determining module, stored in the memory, that determines the functions associated with launching the application have been invoked by the application launcher, wherein the determination comprises determining, using previously injected software hooks, that an initiation function for running the application has been invoked by the application launcher, wherein the injected software hooks are included in the security sandbox and located at a location of a start of the one or more functions to monitor how an original application launcher executing within the security sandbox attempts to access a resource provided in an operating system environment of the computing device;
- a query module, stored in the memory, that queries a policy manager comprising a security policy to determine whether the application is potentially harmful;
- a security module, stored in the memory, that performs, based on the security policy, a security action preventing the application launcher from launching the application from the security sandbox on the computing device upon determining that the application is potentially harmful; and
- at least one physical hardware processor that executes the loading module, the monitoring module, the determining module, the query module, and the security module.

11. The system of claim 10, wherein the security module further performs, based on the security policy, a security action allowing the application launcher to launch the application from the security sandbox upon determining that the application is not potentially harmful.

12. The system of claim 10, wherein the monitoring module monitors the one or more functions associated with launching the application from the application launcher by monitoring an activity manager associated with the application launcher for the initiation function.

13. The system of claim 10, wherein the query module queries the policy manager comprising the security policy to determine whether the application is potentially harmful by scanning the application using the policy manager to determine, based on the security policy, whether the application is potentially harmful.

14. The system of claim 10, wherein the query module queries the policy manager comprising the security policy to determine whether the application is potentially harmful by querying the policy manager for a blacklist to determine whether the application is potentially harmful.

15. The system of claim 10, wherein the security module performs, based on the security policy, the security action to prevent the application launcher from launching the potentially harmful application from the security sandbox on the computing device upon determining that the application is potentially harmful by blocking the application from being executed on the computing device upon determining, at an application run-time, that the application is potentially harmful.

16. The system of claim 10, wherein the security policy is based on one or more of a time and a location associated with the launching of the application on the computing device.

17. The system of claim 10, wherein the potentially harmful application comprises at least one of malware and grayware.

18. The system of claim 10, wherein the application launcher comprises a mobile device application launcher.

19. A non-transitory computer-readable medium comprising one or more computer-executable instructions that, when executed by at least one hardware processor of a computing device, cause the computing device to:
- load an application launcher into a security sandbox on the computing device;
- monitor one or more functions associated with launching an application from the application launcher;
- determine that the functions associated with launching the application have been invoked by the application launcher, wherein the determination comprises determining, using previously injected software hooks, that an initiation function for running the application has been invoked by the application launcher, wherein the injected software hooks are included in the security sandbox and located at a location of a start of the one or more functions to monitor how an original application launcher executing within the security sandbox attempts to access a resource provided in an operating system environment of the computing device;
- query a policy manager comprising a security policy to determine whether the application is potentially harmful; and
- perform, based on the security policy, a security action preventing the application launcher from launching the application from the security sandbox on the computing device upon determining that the application is potentially harmful.

20. The non-transitory computer-readable medium of claim 19, wherein the one or more computer-executable instructions further cause the computing device to perform, based on the security policy, a security action allowing the application launcher to launch the application from the security sandbox on the computing device upon determining that the application is not potentially harmful.

* * * * *